July 22, 1941. H. F. ELLIOTT 2,249,753
ELECTRIC CONTROL APPARATUS
Filed June 7, 1939 6 Sheets-Sheet 2

Inventor:
Harold F. Elliott
By Foorman L. Mueller
Atty.

July 22, 1941.  H. F. ELLIOTT  2,249,753
ELECTRIC CONTROL APPARATUS
Filed June 7, 1939  6 Sheets-Sheet 4

Inventor:
Harold F. Elliott
By *Troman L. Nuell*
Atty.

July 22, 1941.    H. F. ELLIOTT    2,249,753
ELECTRIC CONTROL APPARATUS
Filed June 7, 1939    6 Sheets-Sheet 5

Inventor:
Harold F. Elliott.
By Foorman L. Mueller
Atty.

July 22, 1941.  H. F. ELLIOTT  2,249,753
ELECTRIC CONTROL APPARATUS
Filed June 7, 1939  6 Sheets-Sheet 6

Fig. 17.

Inventor:
Harold F. Elliott
By Foorman L. Mueller
Atty.

Patented July 22, 1941

2,249,753

UNITED STATES PATENT OFFICE 2,249,753

ELECTRIC CONTROL APPARATUS

Harold F. Elliott, Palo Alto, Calif.

Application June 7, 1939, Serial No. 277,856

20 Claims. (Cl. 74—568)

My invention relates in general to control apparatus and more in particular to electric control apparatus employed in tuning a radio receiver to a plurality of predetermined signal frequencies.

A tremendous amount of development work has been carried on for a number of years on electric tuners for radio receivers, and many different structures have been utilized commercially. Although several of these devices have accomplished the actual tuning of a radio receiver in a fairly satisfactory manner, the electric tuners in commercial form have substantially all been complicated and expensive and so large that they took up a considerable amount of space in the radio receiver apparatus to which they were applied. The complicated structure increased the cost of the tuners and in many instances the servicing and maintenance thereon, to such an extent that the complete radio receiver to which the tuner was adapted was out of the popular price classes, and sales thereof were relatively limited. Furthermore, the bulkiness of the tuners of the prior art was such in many instances that it could not be employed in many of the popular priced receivers enjoying large sales because such receivers were relatively small in size as a result of the popular demand as well as the price thereof. In addition, the prior tuners operated relatively slowly, in fact so slowly that they normally required holding circuits operable during the tuning operation, which increased the complexity and cost of the devices. The slow operation was not attractive to the operator.

It is an object of my invention to provide improved electrically operated control apparatus which can be readily applied to many types of controllable mechanism including automobile radio receivers, and radio receivers for home use.

A further object of my invention is to provide a compact, simple, rugged, and inexpensive electrically operated control apparatus.

A still further object is to provide electric control apparatus which operates very quickly and positively, and which can be quickly and simply adjusted to various predetermined control positions without the use of special tools or the like.

One of the features of my invention is the provision of the control apparatus in a preassembled unit which can be completely assembled and tested under operating conditions before it is ever assembled into the structure for which it is adapted.

Another feature of my invention is the provision of adjustable control structure which includes a plurality of axially mounted rings having only a mechanical function in the operation of the control structure, and being individually adjustable independent of other rings in the structure.

Another feature is the provision of simplified jackscrew and lever structure for varying the friction on the control rings in the control apparatus of my invention to permit their individual angular adjustment and likewise maintain them positively fixed in an adjusted position.

A still further feature is the provision of non-rotatable yet axially flexing means for separating the individual control rings, which makes it possible to space the rings very close together yet permit them to be individually adjusted without disturbing the adjacent rings.

Figures 1, 4:
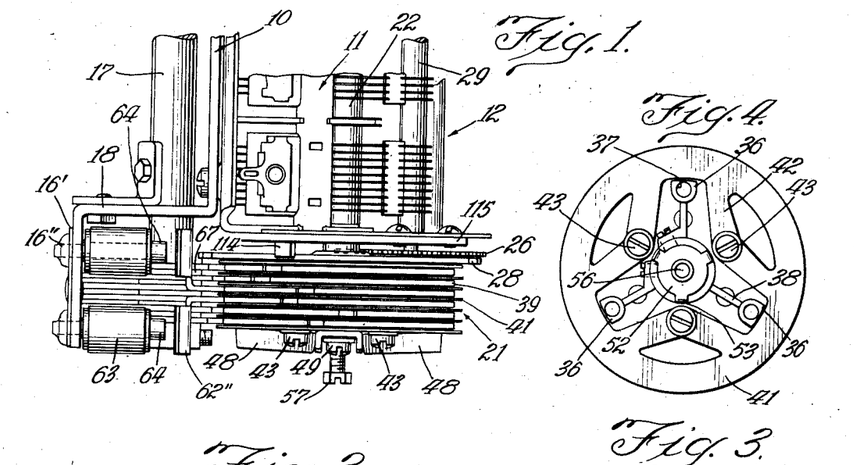
Fig. 1 is a top plan view of my complete control device in a preassembled unit.
Fig. 4 is a detail elevational view of a separator disc for limiting the axial movement of a control ring, and one of the elements for varying the friction on such disc and ring, taken along the line 4—4 of Fig. 3.
Figure 2:
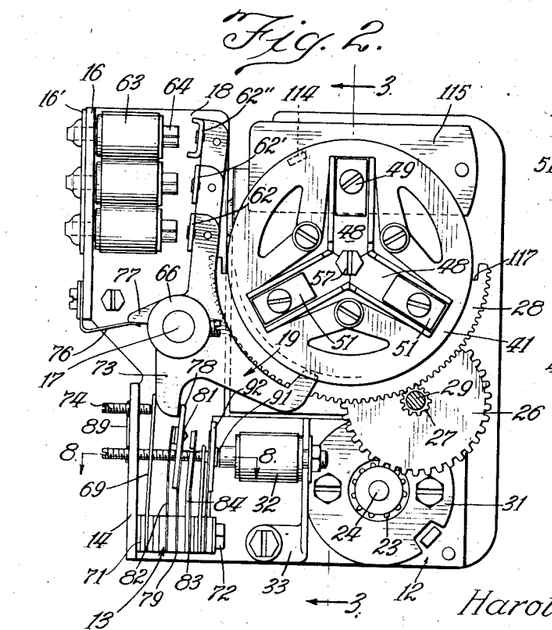
Fig. 2 is a front elevation thereof.
Figure 3:
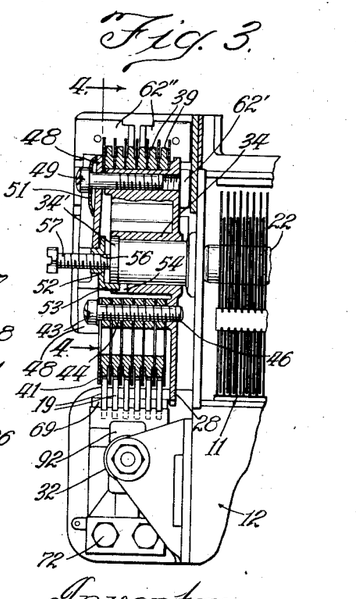
Fig. 3 is a vertical sectional view approximately along the line 3—3 of Fig. 2.
Figure 11:
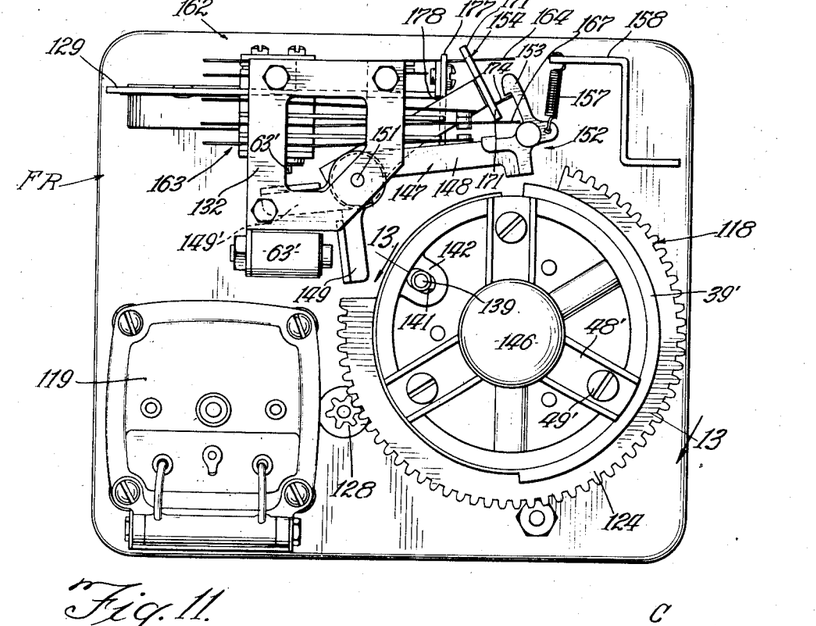
Fig. 11 is a front elevation of a modification of my invention.
Figure 12:
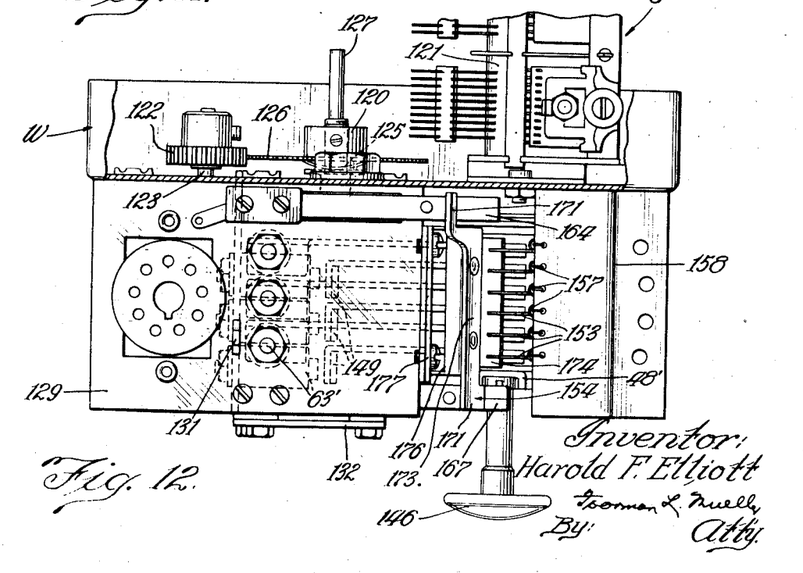
Fig. 12 is a top plan view of the complete preassembled unit of Fig. 11.
Figures 13, 16:
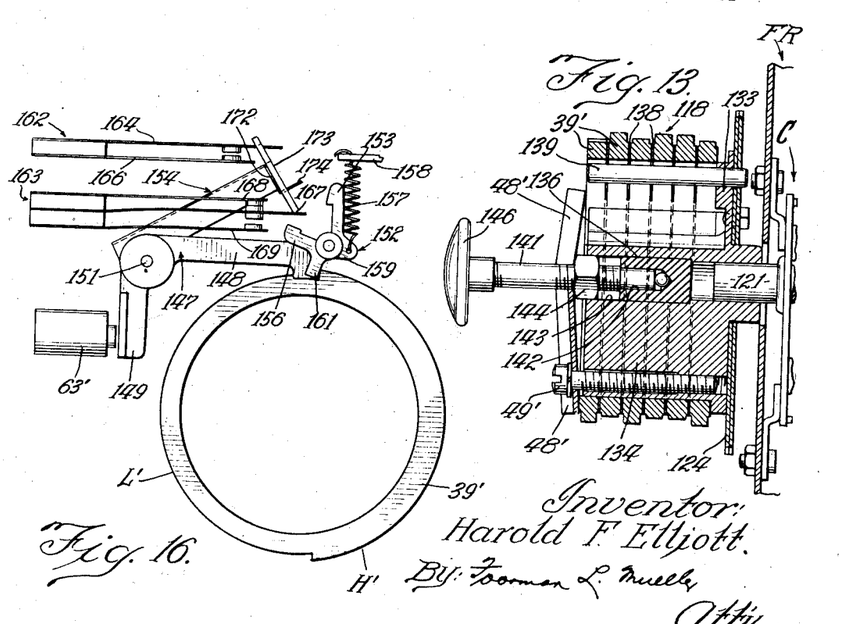
Fig. 13 is a fragmentary sectional view approximately along the line 13—13 of Fig. 11.
Fig. 16 illustrates the pivoted latch in stopped position on the control ring and the switch structure in a corresponding position.

The compactness of the complete tuner of my invention and particularly that of the control ring assembly is an important feature of my invention. The illustrations in Figs. 1 to 3 are made full size as to a commercial embodiment of the invention, and a second commercial embodiment is illustrated in Figs. 11 to 13 in actual size.

A still further feature of my invention is the provision of pivoted latches acting with the control rings in the complete control operation, with the arms all pivoted from the same shaft and each having a ring stopping portion in alignment with one another on a line parallel to the pivot shaft, and yet provided in a varied shape and size as to their remaining structure so that solenoids acting to pivot the latches can be arranged in the most compact and simple manner to take up the smallest possible space therefor.

Other objects and features of my invention will be apparent from the following description taken with the drawings, in which.

In practicing my invention I provide a frame for a preassembled radio tuning control unit which includes resonant frequency changing structure such as a variable condenser mounted on the frame, and a rotary control assembly angularly adjustably supported on a rotary shaft journalled in the frame and operatively connected with the resonant frequency changing structure of the complete unit. Control rings in the control assembly are normally frictionally held against rotation relative to their supporting hub and rotary shaft, but the friction can be removed and the rings individually and independently rotated relative to the hub to a position corresponding to a predetermined signal frequency. With the control rings then frictionally retained against rotation, the control assembly and the resonance frequency changing structure therewith are rotated by suitable driving means, such as an electric motor through the various predetermined tuning positions where each control ring as it is selected for a tuning operation is stopped mechanically by a pivoted latch riding on the circumference of the control ring. Each pivoted latch is selectively brought into engagement with a corresponding control ring upon pushing a control button or otherwise closing an operating switch and circuit to energize a solenoid therefor. The energizing circuit can be closed at the radio receiver or from a remote position. Pivoting of a latch as described, operates switching apparatus which determines the direction of rotation of the driving motor and hence the direction of rotation of the control ring assembly, and the rotation continues until the latch engages a recess in the selected control, which has been previously adjusted to correspond in position to a desired signal frequency. The button switch or some other operating switch is held closed during this entire tuning operation and when released at the stop position for the control ring, opens the driving motor circuit.

Referring now to the drawings, a substantially U-shaped one-piece frame 10 supports a variable condenser 11 and a motor 12. These portions of the complete unit are supported on the body portion of the frame and a switch portion, indicated generally by the reference character 13, is supported on a frame extension 14, and another frame extension 16 supports the operating solenoids for the pivoted latches, as will be hereinafter explained. A relatively heavy rod or bar 17 is fixedly supported in the two legs 18 of the frame 10 with one end of the shaft extending beyond its adjacent frame leg 18 for pivotally supporting thereon all of the latches as 19. The adjustable and rotatable control assembly 21 is mounted on an extension of the condenser shaft 22, or a second shaft coupled thereto, and such control assembly and the rotor plates of the variable condenser 11 are rotatably driven by the motor 12 through a train of gears including a fibre gear 23 on the motor shaft 24, an intermediate spur gear 26 and pinion gear 27 secured thereto, and a segmental gear on the back plate 28 of the control assembly on the rotary shaft 22. The spur gear 26 and pinion gear 27 are each rigidly secured to a shaft 29 rotatably supported in a pair of frame plates 31 mounted onto the end motor frame plate at each end of the motor. A solenoid 32 for the muting relay, as will be described, is mounted on a supplementary bracket 33 which likewise is secured onto one end of the motor frame.

Figures 9, 9A, 10:
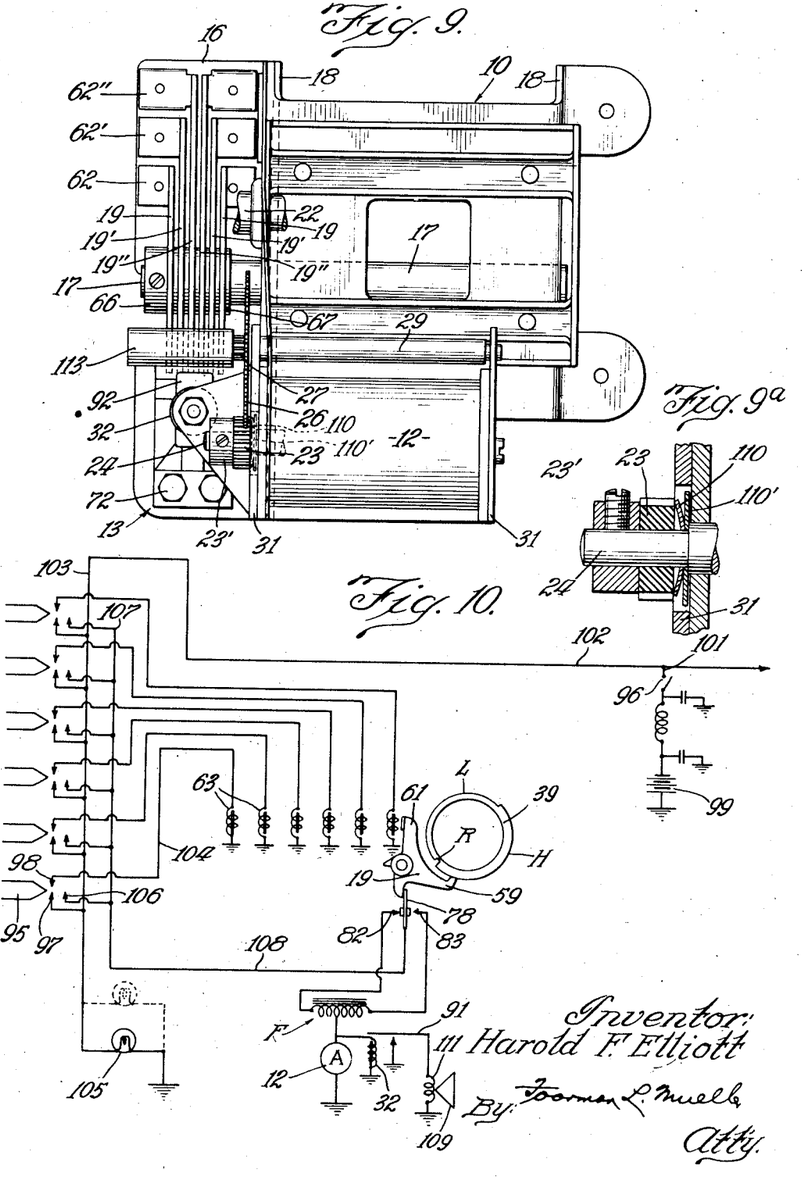
Fig. 9 is an elevational view of the preassembled unit looking to the left in Fig. 1, with the control ring assembly and the rotor and stator plates of the variable condenser omitted for purposes of clarity in illustration.
Fig. 9a is an enlarged detail view of the slip clutch for the device of Figs. 1 to 10.
Fig. 10 is a schematic illustration of a circuit for one adaptation of my invention as embodied in Figs. 1 to 9, inclusive.

All of the above described structure is preassembled as a complete unit and with it all open and readily available, as shown in Figs. 1, 2 and 9, particularly, it is completely checked and tested before it is assembled into the radio receiver for which it is adapted.

As to the rotary control assembly, this includes a die-cast one-piece member including a hub portion 34 rigidly secured to the shaft 22 by set screws or the like, and the integral combination back plate and segmental gear 28. Integral with the back plate 28 are three bosses 36 equally angularly spaced around the back plate as shown in Fig. 4, each having a center cavity 37 therein. The bosses 36 are connected with the hub 34 by integral ribs 38 therebetween. The outside of each boss 36 is curved slightly to correspond to a circle drawn from the center of the shaft 22 as a center and passing through the outside surface of each boss, and supported upon the three bosses 36 are a plurality of identical control rings 39 (Figs. 3 and 5) corresponding approximately in inside diameter to the diameter of the circle just described. Intermediate each two control rings 39 and on the outside of the control assembly at each end thereof are identical separators or friction discs 41 (Figs. 3 and 4). Each disc 41 is provided with a plurality of inner-webs 42, and the discs are secured to the die-cast member against angular movement with relation thereto by means of a screw 43 extending through a corresponding aperture in each web 42, and corresponding washers 44 (Fig. 3) therebetween. Each screw is threadably secured in a corresponding threaded aperture 46 in the back plate 28 of the die-cast member. The washers 44 correspond in thickness substantially to the width of the control rings 39, and space the discs 41 apart a corresponding distance. The discs, or separators, are provided in a thin flexible fibre composition material. As can be seen from Fig. 4, the ring-like outer portion of each separator is spaced slightly from the three bosses 36 and flexes axially slightly at the outer circumference due to the radial distance between the fastening screws 43 and the circumference of the disc. Although these discs positively separate the control rings 39 they do permit a slight axial movement of the rings so as to permit the control ring assembly to open up enough to permit an angular adjustment of each control ring with reference to the bosses 36, and hence the rotary shaft 22 to which the die-cast member is rigidly secured. As previously described, the separators are all fixed with reference to the die-cast member and prevent the angular movement of control rings adjacent a ring being angularly adjusted. Due to the thinness of the separators the entire control ring assembly is very narrow as can be seen in Figs. 1 and 3 particularly to in turn assist in making the entire unit relatively narrow, and very compact.

In the operation of the control apparatus, and after the control rings 39 are each set to a predetermined angular position with reference to the shaft 22, as will be explained, the rings 39 and the friction discs 41 are compressed axially as an assembly and frictionally retained against movement relative to the die-cast member and hence the shaft 22. The necessary frictional pressure is obtained by a friction unit which includes a plurality of one-piece levers 48 secured adjacent one end to the control assembly by means of screws 49 threadably secured in the apertures 37 of the bosses 36. A shim 51 of spring steel is employed intermediate the head of the screw 49 and the body of the lever 48 to provide some spring pressure upon the ring assembly to prevent the rings slipping out of adjustment during the operation of setting them for the desired tuning frequencies. The friction unit also includes an apertured cap-like member 52 having a plurality of radial arms 53 on the outside thereof bent at right angles to the body of the member for engaging in corresponding notches 54 extending axially on the outside of the hub 34. The aperture 56 in the member 52 is provided at an embossed portion thereof, and has an angular collar thereon. The collar is threaded to receive a screw 57, while the inner end of each of the levers 48 is notched slightly to conform to the circumference of the collar. The same end of each lever is beveled to fit with the adjacent levers as shown in Fig. 2 and form a broken aperture at their inner end conforming in shape and size to the circumference of such collar. The screw 57 threaded in the member 52 engages a hardened steel disc 34' pressed into a recess in hub 34, at the end of the rotary shaft 22. Rotating the screw 57 in a clockwise direction for a right hand thread causes the member 52 to move axially to the left as viewed in Fig. 3 relative to the screw 57, and as it moves it carries therewith the inner end of each of the levers 48. With the levers 48 retained at the screws 49, their outer ends compress the rings 39 and discs 41 against the back plate 28 until the desired frictional pressure on the rings is obtained.

Figure 5:
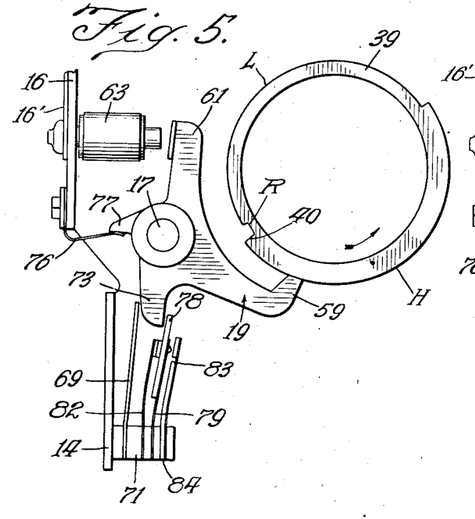
Fig. 5 is a detailed, somewhat diagrammatic illustration of a control ring, a pivoted latch, and the switch and solenoid structure associated therewith. In this figure the latch is shown on the high side of the control ring with the operating switch in a corresponding position, as contrasted to the idle position for this structure in Fig. 2.
Figure 6:
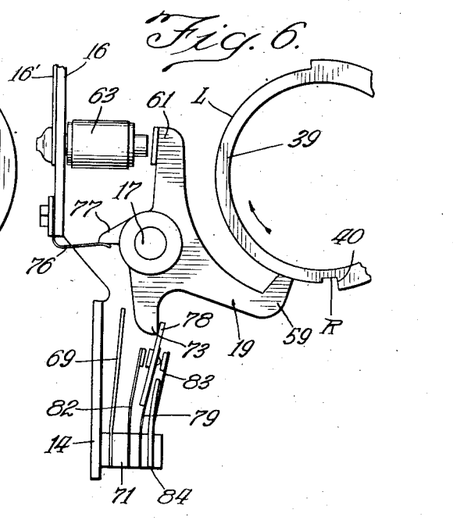
Fig. 6 is a view similar to Fig. 5, showing the same structure in operating position, with a latch on the low side of the control ring.

Each control ring 39 is preferably die-cast in metal, but inasmuch as its function is purely mechanical and not electrical it can be provided in any material desired. The ring includes a high side H and a low side L each extending over slightly less than 180° of the outer surface of the ring, and separated at contiguous ends thereof by a recess R (Fig. 5). A stop shoulder 40 is provided on one side of the recess R at the high side H of the ring. Cooperating with each ring 39 is a corresponding latch 19 pivotally mounted on a fixed shaft 17 as previously described. In the present embodiment of my invention, six latches are employed, as shown in Fig. 9. In order to provide as compact an assembly as possible, and provide adequate mounting and operating space for the latch magnets as will be described, and yet maintain the tips of the latch arms 59 all in alignment, the six latches are pivoted on the same shaft 17, but the magnet arm 61 of each latch varies in length, and symmetrical latches are provided in pairs. For convenience the pair of latches having the shortest magnet arm 61 are indicated by the reference character 19 (Fig. 9), those latches having the next longest magnet arm are identified by the reference character 19', and the third pair of latches are numbered 19''. Armature portions 62, 62' and 62'' on the latches 19, 19' and 19'' respectively, extend at right angles and outwardly therefrom a varying distance, and the actuating magnets 63, with one for each latch, can be mounted in two straight lines on the frame extension 16, as shown in Figs. 1 and 2, and still be directly in the path of movement of the armatures. The core 64 for each magnet is rigidly secured in a corresponding aperture in the frame extension 16 by soldering the core to a plate 16' as shown at 16''. This arrangement permits accurate positioning of the magnets, latches, and rings relative to one another in an optimum operative relationship. The winding for each magnet is grounded to the frame for the control unit as is shown in Fig. 10 by securing one end of such winding to the core. The latches 19 to 19'' are pivotally secured on the stationary shaft 17 against axial movement relative thereto by a collar 66 secured to the outer end of the shaft, and a washer 67 abutting a corresponding shoulder on the shaft to define the inner limits of the latch assembly. A washer identical with washer 67 is included intermediate each two latches to space them apart for easy pivotal movement, and to correspond with the spacing of the control rings 39 in the control assembly 21.

For purposes of illustration a latch 19 is shown in Figs. 2, 5, 6, and 7, with its associated control ring 39 and magnet 63. The latch is shown in its three possible operating positions with three corresponding positions of the ring 39, and the switch mechanism 13 is shown in three corresponding positions to which it is operated by the latch 19. This mechanism is shown in idle position in Fig. 2. This mechanism includes a metal stop plate 69 mounted at one end upon fibre laminations 71 which are part of a similar insulating stack for the entire switch mechanism through which it is secured to the extension 14 by screws 72. The other end of the stop plate is adjustable relative to an ear 73 on the latch 19 by means of an adjusting screw 74 secured in extension 14. The ear 73 of the latch 19 and the corresponding ears of the other latches rest against this stop plate 69 when in idle position. They are urged to this position by spring arms 76 secured to the frame extension 16 which bear against a corresponding radial ear 77 on the latch 19, and similar ears on each of the other latches. The ears 73 of the latches operate for electric switching purposes against an insulated switch arm 78 secured to a metal switch leaf 79 which in turn is supported in the lamination stack 71. The leaf 79 has a pair of contact points 81 extending to each side of the switch arm 78 for engagement either with a corresponding contact point on the metal switch leaf 82 or a switch leaf 83. The leaves 82 and 83 are likewise secured in the lamination stack and insulated from each other metal portion of the switch mechanism thereby. The switch leaf 83 bears against an insulating plate 84 as shown in Figs. 2 and 8, particularly, with the latter being flexible enough to be movable toward and away from the switch arm 78.

Gap adjustments for the various flexible elements of the switch mechanism as described are made by screws 86 and 87, each threadably secured in the frame extension 14 and bearing against or operatively connected with switch leaves 83 and 82 respectively. The adjusting screw 87 is insulated from the switch leaf 82 by a fibre button 88 secured to the switch leaf 82. The screws 86 and 87 are insulated from the switch element through which they must pass in order to reach their corresponding elements 83 and 82 respectively by being positioned in enlarged apertures in the metal stop plate 69 and the metal leaf 79 on the switch arm 78 as shown clearly in Fig. 8. A wire spring 89 is woven around the adjusting screws to hold them in adjustment.

During the tuning operation, the voice coil in the radio receiver is shorted out so that undesirable noises which would normally be reproduced in the speaker for the receiver are muted. This muting is accomplished by a relay which is grouped with the switch mechanism and includes the magnet 32 and a flexible armature 91 mounted in the stack of laminations as shown in Fig. 2. An insulating plate 92 is likewise mounted in the lamination stack for adjusting the position of armature 91.

Figure 8:
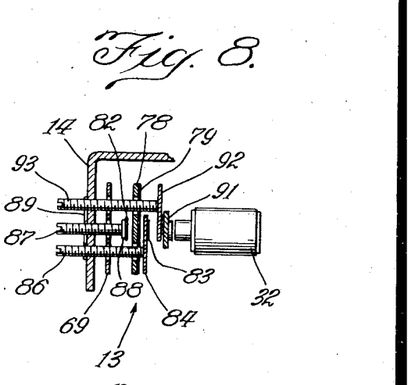
Fig. 8 is a detailed sectional view approximately along the line 8—8 of Fig. 2, showing the adjusting screws and associated switch elements adjusted by such screws.

The position of the insulating plate 92 and armature 91 is adjusted by a screw 93 threadably secured in the frame extension 14 and extending through corresponding apertures in the stop plate 69 and switch arm 79 so as to be out of contact therewith as shown in Fig. 8. The position of the plate 92 determines the idle position of the armature 91 and consequently the armature gap at the magnet. When the driving motor is energized the magnet 32 is energized to attract the armature 91 and close the muting circuit as will be subsequently explained.

The operation of my electric tuner will be more clear from a consideration of the circuit diagram of Fig. 10. A series of push-buttons are provided with each one indicated by the reference character 95, and these may be appropriately mounted on the radio receiver itself or on a remote unit connected with the receiver by an electric cable. After the receiver is turned on by closing the switch 96 in the current supply line for the tuner and the radio receiver, a selected button 95 may be pressed to engage a pair of switch contacts 97 and 98. Engaging these contacts closes a circuit from the current supply 99, which in this case is a battery because the circuit is illustrated for an auto radio receiver, through the switch 96 (which has been moved to closed position from the position illustrated in Fig. 10), through a lead 101 and 102, to a conductor 103 connected to the switch contact 97 and to pilot lamp 105. The conductor 103 is common to all of the switch contacts corresponding to contact 97 on each of the buttons 95. Switch contact 97 and conductor 103 may be electrically connected to a corresponding latch magnet 63, which is connected to ground at one side, through conductor or leads 104 via the switch contacts 98. Closing this circuit energizes the magnet 63 which attracts the corresponding pivoted latch 19 thereto, and the angular movement of the latch under the attraction of the magnet 63 depends upon the angular position of a corresponding control ring 39 at that particular time. As illustrated in Fig. 10, the latch 19 stops on the high side H of the ring 39. It is then in a position corresponding to that shown in Fig. 5 with the switch arm 78 in turn remaining in contact with the switch leaf 82. The switch arm 78 and contact 82 are in engagement even at idle position, as shown in Fig. 2. The gap at idle position between the tip of the latch arm 59, and the high side H of the ring 39, and the gap between the switching ear 73 of the latch and the switch arm 78 is such that when the latch 19 is pivoted slightly to the high side H of the ring 39, the arm 78 and contact 82 remain in engagement. This switch adjustment is accomplished by means of the screw 74 against the stop plate 69 and the screw 87 against the switch leaf 82.

A third switch contact 106 is provided for the push-button 95, and although this is insulated from the contacts 97 and 98, it is spaced only slightly therefrom and the normal operation of the push button 95 moves the same inwardly so that it engages not only with the contacts 97 and 98 but also the contacts 106. When this occurs a circuit is completed through the field F of the motor 12, extending through the conductor 107, conductor 108, switch arm 78, switch contact 82, and through the motor field F and armature A to ground. The conductor 107 is electrically common to all of the switch contacts 106 for the push buttons 95. Energizing the motor field F causes the motor to rotate, to in turn rotate the control assembly through the gear 28, and the shaft 22 having the condenser 11 thereon. The direction of rotation of the motor will be hereinafter described.

In order to prevent any undesirable noises at the loud speaker 109 during the rotation of the condenser through various signal frequencies as it moves to the particular predetermined frequency desired, the voice coil 111 of the speaker is shorted out by drawing the switch arm 91 of the muting switch to the magnet 32, energized when the motor current is energized, which completes a circuit through the switch arm and grounded magnet core, and the voice coil to ground.

Figure 7:
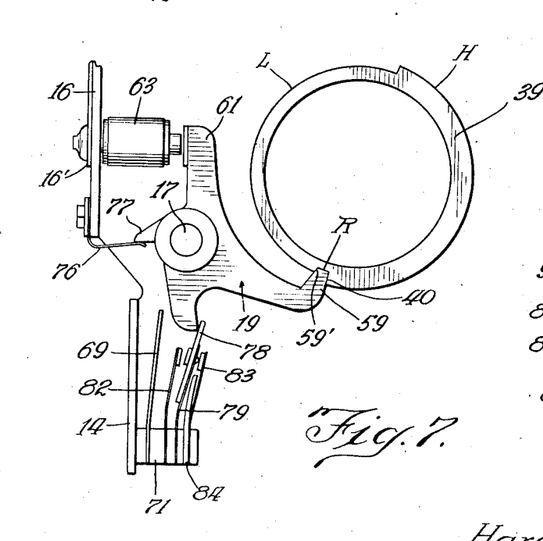
Fig. 7 illustrates the same structure with the latch and control ring in stopped position, which is the same regardless of whether the control ring rotates in a direction corresponding to the high side or the low side thereof.

The push button 95 is held in closed position by the operator until the tuning operation is completed. This is so rapid that the button is held only momentarily even while the condenser 11 and the control assembly 21 are moving the limit of their angular movement or approximately 180°. In fact in one commercial embodiment of the invention the maximum angular movement of the tuning mechanism can be accomplished in approximately one second. In the position of the illustration of Fig. 10, the control ring 39 is driven in a counter-clockwise direction by the motor 12 when the latch 19 is pivoted to the high side H. With control rings of such relatively great diameter as shown in Fig. 2, and yet the maximum tuning movement being accomplished in approximately one second (in one embodiment), the great speed of movement of a control ring past the selected latch can be understood. Normally the ring driven in a counterclockwise direction passes the latch tip 59' at the recess R, permitting the latch to be pivoted until the tip strikes the low side L, which in turn operates the switch 13 to reverse the motor and drive the ring 39 in a clockwise direction. The tip 59' engages the high side of the recess R when the ring is moving in this direction. With the magnet arm 61 of the latch 19 spaced away from the core of the magnet 63, as shown in Fig. 5, the arm is pivoted an additional amount when the tip of the latch arm 59 reaches the recess R, to the stop position as shown in Fig. 7. As can be seen from this description the rotor mechanism is always stopped when going in the same direction, thus minimizing any possible inaccuracies in stopping position due to lost motion in the mechanism, and assuring the maximum precision in tuning. The magnet 63 and the motor 12 remain energized so long as the button 95 is held in operating position. The tip 59' of the latch arm 59 mechanically and positively seats in the recess R due to the shape of the tip and the recess, and holds the control assembly 21 and condenser 11 against rotation. The outer or right hand surface of the tip 59' as viewed in Fig. 7 is preferably accurately formed upon the circumference of a circle with a radius equal to the distance from the center of axis 17 to such surface.

A slip clutch, as shown in detail in Fig. 9a, between the driving gear 23 and the motor shaft 24 permits the latter to rotate while the gear 23 and its connecting train are stopped, thus cushioning the blow which occurs when the latch tip 59 engages with the shoulder 40 for the recess R (Fig. 7), to stop and position the mechanism at the desired frequency. This clutch comprises a spring washer 110, and a flat washer 110' supported on the shaft 24, with the spring washer 110 urging the gear 23 against the collar 123' on the end of the shaft. The washer 110' in turn bears against a shoulder on the shaft 24. When the button 95 is released by the operator it is suitably pressed by a spring out of engagement with the contacts 97, 98 and 106, to open the motor circuit first and then the various magnet circuits. The spring finger 76 acting on the radial ear 77 of the latch 19 returns such latch to idle position as shown in Fig. 2. This return motion of the latch is aided by the spring tension of the switch leaves, 78 and 83.

The operating circuit for the control unit when the latch 19 is drawn into the low side L of the control ring 39 (Fig. 6) is substantially identical with that just described except that the switch arm 78 is moved into engagement with the switch contact 83. This closes the motor circuit through the field F in a reverse direction, causing the motor to rotate the control assembly in a clockwise direction until the tip of the latch arm 59 engages in the recess R as shown in Fig. 7, and as described above.

Before the control unit is operated for tuning purposes as described above, all of the control rings 39, or at least a number corresponding to the number of stations it is desired to tune, are set in predetermined angular positions corresponding to the tuning positions of the condenser 11 for each of the desired stations. Assuming that the screw 57 and its associated mechanism, including the levers 48, are in a non-friction position, a selected button 95 is pushed in to complete the switch connections through the contacts 97, 98 and 106, to in turn energize a corresponding magnet 63 and the motor 12. This causes the corresponding control ring 39 which is still held under a slight friction by spring 51 to rotate until the tip of the latch arm 59 drops into the recess R of the ring. The operator either releases the button 95 entirely and then pushes it in only enough to engage the contacts 97 and 98, or originally lets the button move out of engagement with contact 106, thus maintaining the magnet 63 circuit and breaking the motor circuit. With the latch arm 59 in the recess R, the gear 28 and the die-cast member, including the hub 34 integral therewith, are rotated manually by the operator by an ordinary manual tuning knob at the radio receiver, or at a remote control unit. The knob may be operatively connected by a flexible cable or the like with a molded coupling 113 (Fig. 9) secured to the shaft 29 to which the gears 26 and 27 are likewise secured.

The condenser 11 is then rotated relative to the held ring 39 until it is in an angular position corresponding to the signal frequency desired. This position can be ascertained by the usual dial scale for the radio receiver, which is not shown here, and by listening, or using an output meter. When this position of the condenser 11 is obtained the button 95 is released to open the magnet energizing circuit. This same procedure can be followed for each of the control rings 39, and with each ring separated from each other ring in the control assembly 21 by the axially yieldable but angularly fixed discs or separators 41, there is no possibility of the relative movement between a control ring 39 and the shaft 22 causing any displacement of the control rings previously set.

The limits of movement of the rotors for the condenser 11 are of course determined in the condenser itself. Assisting in this limiting movement, however, is a rigid stop 114 on a plate 115 secured to the adjacent end of the frame for the condenser 11 which in turn is secured to the main frame 10 of the control unit. Shoulders 117 on the segmental gear 28 spaced approximately 180° apart engage the stop 114 at each limit of the condenser.

When the setting operation for the rings 39 is completed, the screw 57 is rotated so as to move the cap member 52 threadably thereon in a direction axially of the shaft 22 and to the left as viewed in Fig. 3, and pivot all of the levers 48 to compress the rings and separator discs of the control assembly against the back plate 28 of the die-cast supporting member. Although a screw with an ordinary slotted head is illustrated in the various figures, to be turned by an ordinary screw driver, I may employ a suitable knob which can be turned by hand, such as that illustrated in Fig. 11.

A modification of my invention is illustrated in Figs. 11 to 17, inclusive. The modification is likewise provided in a preassembled unit including a main frame member FR with side walls W on all four sides of the body portion of the frame member. A variable condenser C is mounted on one side of the frame member and the rotary shaft therefor extends through the frame to carry a rotary control assembly 118 thereon on the other side of the frame member. A motor 119 is rigidly secured to the frame and is connected to the rotary shaft 121 for the condenser C and control assembly 118 by means of a train of gears including a pinion gear 122 secured to the motor shaft 123, and a segmental gear 124 fixedly secured to the control assembly 118, as will be described. Intermediate these gears is a gear 126 on a stub shaft 127 which carries the corresponding pinion gear 128 in meshing engagement with the segmental gear 124. Intermediate the gear 126 and its shaft 127 is slip clutch mechanism comprising hub 120 and spring washer 125 which permits the motor to rotate when the control assembly is held. Hub 120 is secured to shaft 127 by a set screw, and gear 126, which is free to rotate relative to the shaft, is pressed against the hub 120 by spring washer 125, thus giving a friction drive between hub 120 and gear 126. Likewise supported upon the frame member FR is a supplementary frame portion including a plate 129, a bracket 131 and another plate 132, all cooperating to support the pivoted latches, the magnets, and the switch mechanism operating therewith.

The control assembly 118 includes a die-cast one-piece support having a back portion 133 and a plurality of ribs 134 extending axially therefrom to a hub portion 136 in the center of the die-cast member. The hub portion includes a cavity at one side for fitting over the shaft 121 as shown in Fig. 13, and a cavity at the other side for receiving friction adjusting mechanism as will be described. The outer edges of the ribs 134 support a plurality of control rings 39' thereon which are substantially identical with the control ring 39. These include a high side H', a low side L', and a stop recess R', as is clear in Fig. 14. Separating each two adjacent control rings 39' is a thin metal ring 138 which is likewise supported on the outer edge of the ribs 134. The rings 39' are angularly adjustable on the die-cast member as explained for the first embodiment of my invention, and the separator rings 138 are retained against angular movement by means of a pin 139 rigidly secured in the back plate 133 of the die-cast member and extending through apertures 141 (Fig. 11) in ears 142 integral with the rings 138. The pin 139 likewise extends through the gear 124 secured to the back portion 133 and serves as a guide pin for the two halves of the gear 124 as shown in Fig. 13. This gear is provided in two axially aligned identical portions which are spread angularly to take up back lash between the gear and driving pinion gear 128 in the well-known manner.

The control rings, when in set angular position, are held in such position by friction applying mechanism operating generally in the manner described with reference to the structure in the first embodiment of my invention. The friction mechanism includes a screw 141 extending into the cavity in the hub portion 136 comprising a restricted portion 142 and an enlarged portion 143. The inner end of the screw 141 rests against a ball bearing in the restricted portion 142 and an intermediate portion of the screw is threaded for threaded connection with a nut 144. The nut is hexagonally shaped, or in fact may be utilized in any shape other than round, and the side walls of the cavity 143 are similarly shaped so that the nut will not rotate in the cavity. It may however move axially therein. Levers 48' rest at one end against the circumference of the outer ring 39' and at the other end upon the outside face of the nut 144. The end resting upon the nut 144 is notched and beveled to surround the screw 141 as explained for the lever 48. Each lever is retained on the control assembly by a screw 49' extending into a corresponding threaded cavity in each rib portion 134 of the die-cast member. Upon rotating the knob 146 in a clockwise direction for a right-hand thread, for instance, the nut 144 thereon moves axially but non-rotatably to in turn move the inner end of each lever 48' to the left, as viewed in Fig. 13, to apply friction to the control assembly as has been described. In removing friction the knob 146 is rotated in the opposite direction.

The pivoted latches, indicated generally by the reference character 147, include a latch arm 148 and a magnet arm 149, all integral with one another. To condense the operating magnet assembly as much as possible, alternate latches 147 have slightly different configurations for their magnet arms so that the magnet arm 149 for the first latch 147, for instance, is substantially at right angles to the latch arm 148, while the magnet arm 149' (dotted lines, Fig. 11) for the second latch 147 is substantially parallel with the latch arm 148 therefor. The latch arms 148 for all of the latches are in alignment as shown in Fig. 11. All of the latches are pivotally supported upon a stationary shaft 151, and are selectively pivoted into operating engagement with the control rings 39' by solenoids or magnets 63' mounted on the supplementary frame plate 129 and the bracket 131 as shown in Figs. 11 and 12. A trigger 152 is pivotally supported on the end of each latch arm 148. The trigger comprises a plurality of radial portions which include a latch ear 153, for latching engagement with a switch gate 154, as will be described, and a stop ear 156 having a projection thereon for engaging the back edge of the latch arm 148. This engagement limits the pivotal movement of the trigger under the tension of the spring 157 connected intermediate a frame bracket 158 and a radial ear 159 of the trigger. A nose 161 comprises the remaining radial portion and this is of such a shape and size as to be complementary to the stopping tip of the latch arm 148 and increase the effective width of such tip.

Figures 14, 15:
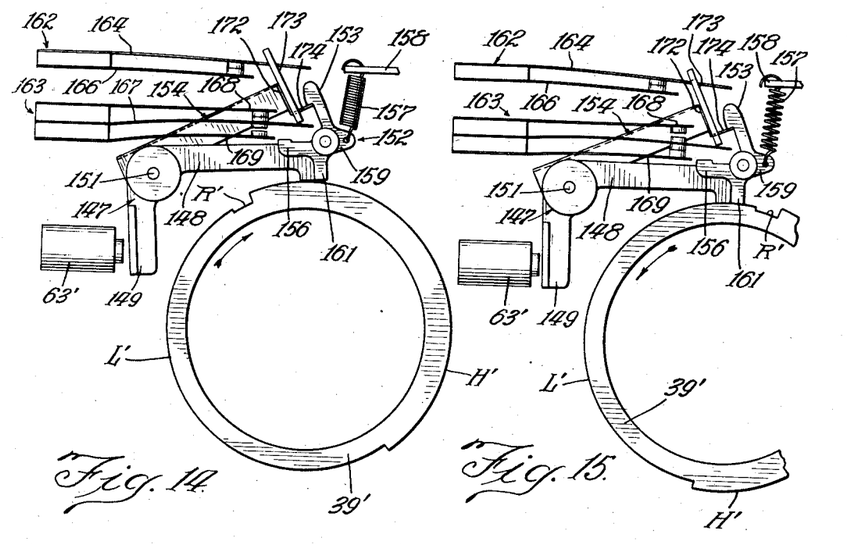
Fig. 14 is an illustration similar to that of Fig. 5, showing the control ring of the modification with a pivoted latch in the high side of the ring as contrasted to the idle position for the latch and switch in Fig. 11.
Fig. 15 is an illustration similar to Fig. 14, with the pivoted latch on the low side of a control ring.

The switching mechanism for the tuning unit includes a motor main line switch 162 and a reversing switch 163. These switches are mounted upon opposite sides of the frame plate 129 as shown in Figs. 11 and 12, with the switch 162 comprising a pair of contact members 164 and 166, and the switch 163 comprising a switch arm 167 with oppositely disposed yieldable contact members 168 and 169. Both switches are operated by the pivoted gate unit 154 which comprises a stamped-out plate having a body portion extending intermediate the two switch assemblies as shown in Fig. 12. A transverse portion 172 carries a switch operating arm 173 with integral side extensions 171 made of insulating material, and a flange 174 over which the trigger ear 153 latches as shown in Figs. 11, 14, and 15. An aperture 176 in the body portion of the gate is positioned so that an insulated stop plate 177 supported on the frame plate 129 may extend through the gate and rest in the back of all of the latches 147, determining the limit of angular movement of the latches in a counter-clockwise direction under the influence of the springs 157. The stop plate 177 is provided with shoulders 178 to define the back limit of pivoted counter-clockwise direction by the switch contact 164 in the switch 162, and the switch arm 167 in the switch 163.

As is illustrated in Fig. 11, in the idle position for the entire tuner mechanism the latches 147 are pulled upwardly, as viewed in Fig. 11, by the springs 157. By virtue of the beveled configuration of the nose of the trigger arm 153 which engages the flange 174, the trigger 152 is pivoted to snap into latching engagement with such flange on the gate. In the meantime the switch contact 164 and the switch arm 167 are holding the gate in retracted position, so that the switch operating mechanism is all latched together in an idle position, as will be described more fully hereinafter.

Figure 17:
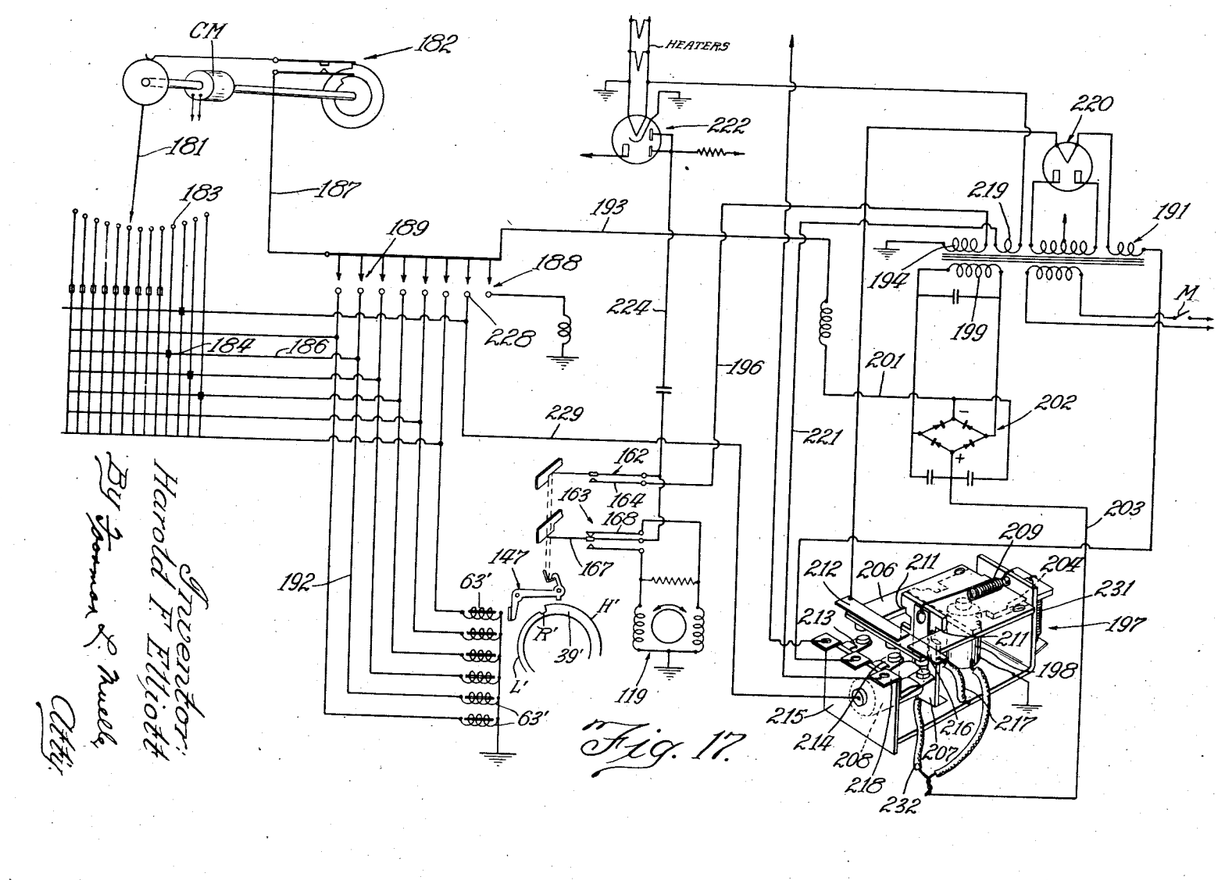
Fig. 17 is a schematic illustration of a circuit diagram for one adaptation of a modified structure of Figs. 11 to 16 inclusive.

A commercial adaptation of this modification of my invention is illustrated schematically in Fig. 17 showing a time control clock described in my copending application, Serial No. 239,696, filed November 9, 1938, including an arm 181 which is driven directly by a clock motor CM so as to complete an entire cycle of operation in twenty-four hours. A cam switch 182 is provided on the clock mechanism, and this is designed to close every fifteen minutes in a twenty-four hour period. A plurality of conductors 183 are likewise provided on the clock mechanism and spaced so that the arm 181 engages a conductor 183 once every fifteen minutes thus extending a circuit from the particular conductor 183 through the movable contacts in the switch indicated generally by the reference character 182. The conductors 183, in turn, are adapted to be interconnected with electric tuner leads by slidable contacts 184. A tuner lead as 186, in turn, is electrically connected with a corresponding latch magnet 63' on the tuner mechanism of the present invention. The circuit from the cam switch 182 extends through leads or conductors 187, 193, and 201, to the negative terminal of a rectifier 202 which serves to energize all control circuits. The conductor 187 is likewise common to a plurality of push-buttons 189 which may be operated from a panel on the front of the radio receiver or from a unit remote from the radio receiver. An energizing circuit, as will be described, can be closed at fifteen minute intervals throughout a twenty-four hour period by means of the arm 181 and cam switch 182 as was described.

Simply from the standpoint of simplification of description, however, the operating circuit for the tuner will be described as originating through the closing of a push-button 189 which of course is in parallel connection to each other operating circuit through the clock mechanism. In the first place, the main line switch M, connected directly into the current supply line for the entire radio receiver system, is closed. With this closed, the power transformer 191 is energized and current is available for operating a radio receiver as well as the tuning mechanism. This also makes the operating circuit available for the tuner motor 119. Closing a selected push-button switch 189 extends the circuit on one side through a conductor 192 to a corresponding latch magnet 63', and then to ground. On the other side of the push button the circuit is extended through conductor 193 to the negative side of the rectifier 202. The positive side of the rectifier is connected through lead 203 to magnet 198 and thence to ground, completing the circuit. Magnet 198 is thus in the common ground return circuit between all solenoids 63' and the rectifier 202. Magnet 198 closes power relay 197 and energizes the heater and B supply circuits of the receiver whenever any solenoid 63' is operated.

Energizing the magnet 198 attracts the pivoted armature 204, which in turn is secured to an insulating plate 206. When the armature 204 is in engagement with the core of the magnet 198 a pivoted latching armature 207 associated with the magnet 208 is pulled toward the right, as viewed in Fig. 17, by the spring 209 and latches the plate 206 under the shoulders 211 on the armature 207. With the attraction of the armature 204 the contact unit 212 on the plate 206, is brought into electrical engagement with corresponding contacts 213 and 214 supported on an insulating plate 215 on the end of the relay frame, and a ground connection is established through the contact 216 on the plate 206 and the conductor 217 soldered or otherwise secured onto the metal frame for the power relay. The contact 216 is electrically connected with a third contact 218 on the plate 215. Contact unit 212, and its corresponding contacts 213 and 214 are in the output and filament circuits of power rectifier tube 220 completing the B supply circuit for the radio receiver when closed. Contact 216 closes the heater circuits for the receiving tubes utilizing secondary 219 on the power transformer.

Although the motor voltage is available when the power transformer 191 is energized it is not utilized until a push-button 189 is operated or an operating circuit is closed through the clock mechanism. The motor is connected, upon such closing, into a circuit including secondary winding 194 on the power transformer which is connected on one side to ground and on the other through conductor 196 to motor switch 162. This circuit likewise provides the muting voltage via tube 222 which supplies a rectified potential for muting the receiver during a tuning operation. The conductor 224 is connected to the switch arm 167, via a coupling condenser. Switch 188 serves to close the relay 197 and turn the set on manually, and operates separately from the automatic control circuits.

In the position of the control ring 39' in Fig. 17, the latch 147 is pivoted by the energized magnet 63' until it engages the high side H' of the control ring. This closes the main motor switch 162, energizing the motor. The contacts 167 and 168 remain closed with this action, and a corresponding field in the motor 119 is energized to rotate the control assembly including the control ring 39' in a clockwise direction. This is shown in greater detail in Fig. 14. Rotating in a clockwise direction, the notch or recess R' passes beneath the combined width of the nose 161 of the trigger and the tip of the latch arm 148. This width is greater than the width of the recess R' and under the pivotal urging of the magnet 63' the latch arm 148 merely drops to the low side L'. This is the position shown in Fig. 15. In this position the circuit through the switch arm 168 is opened, and that through 169 is closed thereby reversing the motor 119 and rotating the control assembly with the ring 39' in a counter-clockwise direction. This brings the nose 161 into engagement with the high shoulder of the recess R', pivoting the trigger 152, as shown in Fig. 16, so that the width of the recess R', and the magnet 63' pulls the tip of the latch arm into a firm and complete engagement with the recess R'.

When the trigger 152 pivots at the stopped position the latch ear 153 releases the gate 154 and the switch contact 164, and arm 167 return the gate to idle position opening the motor circuit through the switch 162. This immediately de-energizes the motor 119. The operating magnet 63' however remains energized until the operator removes his finger from the push-button 189. With this operation the control assembly and hence the condenser 117 is always stopped at a predetermined tuning position while the control assembly is rotating in the same direction, namely, a counter-clockwise direction for the embodiment of the invention as illustrated and described herein. This provides a positive and uniform stopping position for each of the control rings 39', and makes for greater precision and uniformity in the operation of the tuning mechanism and hence the tuning of the radio receiver. The power relay armature 204 may be opened by closing the "off" switch 228 which is connected to a conductor 229, connected in turn to the magnet or solenoid 208 of the power relay. When this magnet is energized it attracts the pivoted armature 207 releasing the plate 206 from the shoulders 211 of such armature and permitting such plate to be pivoted away from the contacts 213, 214 and 218 by the spring 231. The magnet 208 is in the circuit with the rectifier 202 by means of a conductor 232 which in turn is connected to the conductor 203 extending to the rectifier 202. The other side of the rectifier 202 is connected by conductors 201 and 193 to push button 228, to complete the circuit.

Although I have illustrated and described my invention in its preferred embodiments, it is understood that modifications therein may be made all within the spirit and scope of the invention, and the invention, therefore, is not limited by the above description and drawings, but is limited only by the scope of the appended claims.

I claim:

1. In a radio tuner having a rotary member for operative connection with radio receiver frequency changing means and having an assembly of a plurality of control members angularly adjustable on the rotary member, means for collectively clamping and unclamping the control members to the rotary member including a screw operatively connected with the rotary member, and extending longitudinally of the axis thereof, a threaded support for the screw mounted on the rotary member and axially but non-rotatably movable with reference thereto upon rotation of the screw, and clamping means operatively connected with said support and with the control member assembly to accomplish clamping of the control members upon axial movement of the threaded support in one direction and unclamping thereof upon axial movement in the other direction.

2. In a radio tuner having a rotary member for operative connection with radio receiver frequency changing means having an assembly of a plurality of control members angularly adjustable and axially movable on the rotary member, means for collectively clamping and unclamping the control members to the rotary member, including a screw operatively connected with the rotary member and extending longitudinally of the axis thereof, a threaded support for the screw mounted on the rotary member and axially but non-rotatably movable with reference thereto upon rotation of the screw, and a plurality of clamping levers each having one end resting upon said threaded support and the other end in operative connection with the control member assembly to accomplish clamping of the control members upon axial movement of the threaded support in a direction away from the rotary member and unclamping thereof upon axial movement in the other direction.

3. In a radio tuner having a rotary member for operative connection with radio receiver frequency changing means and having an assembly of a plurality of control members angularly adjustable on the rotary member, means for collectively clamping and unclamping the control members to the rotary member including a screw operatively connected with an end portion of the rotary member, and extending longitudinally of the axis thereof, a plate-like member having a threaded aperture centrally thereof having integral mounting portions mounted on the rotary member and axially but non-rotatably movable with reference thereto with said plate-like member supporting said screw in the threaded aperture therein and being movable upon rotation of the screw, and a plurality of clamping levers, each lever being supported on said rotary member intermediate the end of each lever with one end of each lever resting upon said plate-like member and the other end operatively connected with the control member assembly to accomplish clamping of the control members upon axial movement of the plate-like member in a direction away from the rotary member and unclamping thereof upon axial movement in the other direction.

4. In a radio tuner having a rotary member for operative connection with radio receiver frequency changing means and having an assembly of a plurality of control members angularly adjustable and axially movable on the rotary member, means for collectively clamping and unclamping the control members to the rotary member including a threaded member having an end thereof in a corresponding cavity in an outer end portion of the rotary member and being operatively connected with the rotary member at said cavity, with said threaded member extending longitudinally of the axis of said rotary member, a threaded support for the threaded member mounted in said cavity and axially but non-rotatably movable therein upon rotation of the threaded member, and a plurality of clamping members each having one end resting on said threaded support and operatively connected with the control member assembly, with said clamping members acting to clamp the control members upon axial movement of the threaded support in said cavity in a direction toward the outer end of the rotary member and to unclamp the control member assembly upon axial movement of the threaded support in the opposite direction.

5. In control apparatus having a rotary unit and a plurality of control members angularly adjustable on said rotary unit, means for collectively clamping and unclamping the control members as an assembly to the rotary unit including a plurality of clamping members extending radially from the axial center of said rotary unit with each of said clamping members being operatively connected with, and retained intermediate its ends upon said rotary unit, with one end of each clamping member in operative connection with the control member assembly, and means in engagement with and common to the other end of each of the clamping members at the axial center of the rotary unit being adjustable in an axial direction with reference to the rotary unit to move the engaged ends of said clamping members in a direction away from the rotary unit to clamp the control members onto the rotary unit and adapted to unclamp the same upon axial movement in the other direction.

6. In control apparatus having a rotary member and a plurality of control members angularly adjustable on said rotary member, means for collectively clamping and unclamping the control members as an assembly to the rotary member including a plurality of levers with each of said levers being supported on the rotary member intermediate the ends of each lever, with each lever extending radially from the axial center of said rotary member and having one end in operative connection with the control member assembly, a one-piece member having an apertured body portion in engagement with the other end of each of the levers and having an integral portion extending at right angles to the body portion for mounting said one-piece member on the rotary member at the end thereof, and screw means supported by said one-piece member in operative connection with the rotary member to threadably adjust said one-piece member in an axial direction toward or away from the rotary member to cause pivotal movement of the levers therewith and unclamp or clamp the control members onto the rotary member depending upon the direction of movement.

7. In control apparatus having a rotary member with an axially extending cavity in one end thereof and a plurality of control members angularly adjustable on said rotary member, means for collectively clamping and unclamping the control members as an assembly to the rotary member including a plurality of levers with each of said levers being supported intermediate the ends thereof on the rotary member and extending radially from the axial center thereof, with each of said levers having one end in operative connection with the control member assembly, an internally threaded member axially movable but non-rotatably movable in the cavity of the rotary member supporting each of said levers at the other end thereof, a screw adjustably connected with said threaded member, positioned in said cavity and extending longitudinally thereof and in operative connection at its inner end with the bottom of said cavity, said internally threaded member being axially movable away from the bottom of said cavity upon rotation of said screw in one direction to carry the other end of each of the levers therewith to pivot said levers and apply pressure to the control member assembly to clamp the same to the rotary member.

8. Rotary control means for radio tuning apparatus including a rotary hub having a plurality of ribs thereon each extending radially from the rotary axis of said hub and all extending in an assembly axially thereof, a plurality of control rings supported on said ribs and angularly adjustable with reference to said hub, and a separating member between each two control rings supported on said hub against angular movement with reference thereto, and means secured to said hub for preventing angular movement of said separating members with reference to said hub.

9. Rotary control means for radio tuning apparatus including a rotary hub having a plurality of ribs thereon extending radially from the rotary axis of said hub and axially thereof, a plurality of control rings supported on said ribs and angularly adjustable with reference to said hub, and a separating member between each two adjacent control rings provided in yielding material and having a circumferential portion intermediate the two adjacent control rings and a web portion within the circumferential portion, and means extending through the web portion of each separating member and secured to said hub for preventing angular movement of said separating members with reference to said hub but permitting a slight axial movement of each separating member at the circumferential portion thereof.

10. Rotary control means for radio tuning apparatus including a rotary hub, a plurality of control rings supported on said hub and angularly adjustable with reference to said hub, a separating member between each two control rings supported on said hub, with each of said separating members having an apertured lug thereon extending inwardly toward the rotary axis of the hub, and means extending through the apertures of said lugs and secured to said hub for preventing angular movement of said separating members with reference to said hub.

11. Rotary control means for radio tuning apparatus including a one-piece rotatably mounted hub portion having a plurality of integral rib portions thereon extending radially from the rotary axis of said hub portion and axially thereof, said hub portion having an integral back plate thereon at right angles to the axis for said hub portion, a plurality of alternate separators and control rings supported on said hub portion and extending in an axial assembly on the outside of said hub portions, with said control rings being individually and selectively angularly adjustable with reference to said hub portion, and means secured to the integral back plate and operatively connected with all of said separators to prevent angular movement thereof with reference to the hub portion.

12. Rotary positioning means for radio tuning apparatus including control means, angularly movable position control members supported on said control means, and separating members intermediate the position control members, means securing said separating members to said control means in a manner to prevent movement in one direction but permitting movement of a portion thereof in a direction substantially at right angles to said one direction.

13. Rotary positioning means for radio tuning apparatus including a rotary member, movable control rings supported on said member, separators intermediate said rings and secured on said rotary member against angular movement, means securing said separators on said rotary member against angular movement each of said separators having a flexible portion extending radially beyond said rings and being axially movable with reference to said rotary member at said flexible portion.

14. In control apparatus having a plurality of control members individually adjustable in a rotary direction to predetermined control positions, the assembled means for supporting said members and holding the same in an adjusted position including axially extending member supporting means having an axial center, a plurality of spacers with a spacer adapted for fitting between each two adjacent control members to permit axial as well as rotary adjustable movement of the control members on the supporting means, with each of said spacers retained against axial and rotary movement intermediate the axial center and outer limits thereof but being axially yieldable adjacent the outer limits thereof, a plurality of retaining means operatively connected with said plurality of spacers at a corresponding plurality of points spaced radially from the axial center thereof and positioned intermediate said axial center and the outer limits thereof, and holding means for applying a holding force to the control members in an axial direction including a plurality of holding members mounted at one end of said assembled means and each extending radially in a different direction from the axial center thereof and operatively connected at one end with the plurality of control members, a mounting fulcrum for each of said holding members, and an adjusting means operatively connected to all of said holding members substantially at the axial center to simultaneously move all of said holding members on their respective fulcrums and apply a holding force to said plurality of control members.

15. Clamping means for applying a holding force to a plurality of axially assembled control members supported on axially extending means and relatively adjustable in a rotary direction thereon, said clamping means including a plurality of separable clamping members extending radially from the axial center of and supported on one end of the axially extending means, means at one end of each for retaining said clamping members on said axially extending means in a position operatively connected with said control members, and axially adjustable means at said axial center operatively connected with the other end of each of said clamping members to simultaneously move such other end of all of the clamping members as levers to apply a clamping force to said control members through said one end of each of said clamping members.

16. Rotary positioning means for control apparatus including rotary supporting means, angularly movable position control members supported on said supporting means, and separating members intermediate the position control members, said separating members each having a plurality of inner portions frictionally connected to said supporting means at a corresponding plurality of places and fixedly maintained against axial and angular movement relative to said supporting means at said inner portions, but each having an outer portion flexible in an axial direction.

17. Rotary positioning means for control apparatus including supporting means, a plurality of control members supported on said supporting means and angularly movable thereon, a separating member intermediate each two adjacent control members having an inner portion axially fixed on the supporting means and having an outer yieldable portion yieldable in an axial direction.

18. Rotary positioning means for control apparatus including rotary supporting means, a plurality of control members supported on said supporting means and angularly movable thereon when in an adjustable condition, a separating member intermediate each two adjacent control members having a plurality of portions operatively connected with said supporting means and maintained at such portions against angular and axial movement relative to said supporting means, and each such separating member having a peripheral portion flexible in an axial direction to permit said angular movement of said control members, and means on said supporting means operatively connected with said separating members at the peripheral portions and adjustable to move said peripheral portions axially and into frictional holding position relative to said control members to prevent angular movement thereof.

19. Rotary positioning means for control apparatus including rotary supporting means, a plurality of control members supported in an axially extending assembly on said supporting means and each being individually angularly adjustable thereon, a separator intermediate each two adjacent control members having an annular outside portion yieldable in an axial direction when the assembly is in an unclamped condition, and having a plurality of portions spaced inwardly from said outside portion operatively connected with said supporting means to maintain said separator on said supporting means rigidly against axial and angular movement relative thereto at said inwardly spaced portions and prevent the angular movement of one of the two adjacent control members while the other is being angularly adjusted.

20. Clamping means for applying a holding force to a plurality of axially assembled control members supported on axially extending means and relatively adjustable in a rotary direction thereon in one position of said clamping means, said clamping means having a plurality of portions extending radially from the axial center of said axially extending means and being individually movable, adjustable means at said axial center operatively connected with said portions and common to all of said portions at the end of each adjacent the axial center, said adjustable means moving said adjacent ends of the portions axially therewith, and means operatively connected with said portions at a point on each spaced radially outwardly thereon from the corresponding adjacent end to act as a fulcrum for each portion during said axial movement of said adjacent ends.

HAROLD F. ELLIOTT.